United States Patent
Greenberger et al.

(10) Patent No.: US 11,537,694 B2
(45) Date of Patent: Dec. 27, 2022

(54) MOTION-BASED CHALLENGE-RESPONSE AUTHENTICATION MECHANISM

(71) Applicant: International Business Machines Corporation, Armonk, NY (US)

(72) Inventors: Jeremy Adam Greenberger, San Jose, CA (US); Craig M. Trim, Ventura, CA (US); Mauro Marzorati, Lutz, FL (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 16/936,724

(22) Filed: Jul. 23, 2020

(65) Prior Publication Data
US 2022/0027439 A1    Jan. 27, 2022

(51) Int. Cl.
*G06F 21/31* (2013.01)
*G06F 21/36* (2013.01)

(52) U.S. Cl.
CPC ............ *G06F 21/316* (2013.01); *G06F 21/36* (2013.01); *G06F 2221/2133* (2013.01)

(58) Field of Classification Search
CPC . G06F 21/316; G06F 21/36; G06F 2221/2133
USPC .......................................................... 726/18
See application file for complete search history.

(56) References Cited

U.S. PATENT DOCUMENTS

| | | |
|---|---|---|
| 9,942,768 B1 | 4/2018 | Frank et al. |
| 10,257,229 B1 | 4/2019 | Kuo et al. |
| 2007/0271466 A1* | 11/2007 | Mak ...................... G06F 21/316 713/184 |
| 2015/0084859 A1* | 3/2015 | Itzhaik .................... G06F 3/038 382/103 |

(Continued)

FOREIGN PATENT DOCUMENTS

WO    2014185861 A1    11/2014

OTHER PUBLICATIONS

Wikipedia, "CAPTCHA", From Wikipedia, the free encyclopedia, last edited on Dec. 19, 2019, printed Jan. 24, 2020, 11 pages.

(Continued)

*Primary Examiner* — Jacob Lipman
(74) *Attorney, Agent, or Firm* — Stosch Sabo (57) ABSTRACT

Described are techniques for differentiating humans from bots. The techniques including a computer-implemented method comprising presenting a motion-based challenge-response instruction to a user via a user interface of a first device of a plurality of devices associated with the user and communicatively coupled to one another by a network, where the motion-based challenge-response instruction describes at least one motion that is performable by the user and detectable by at least one of the plurality of devices, and where the motion-based challenge-response instruction is configured to differentiate humans from bots. The method further comprises determining that device data from one or more of the plurality of devices matches the at least one motion. The method further comprises authenticating the (Continued)

first device in response to determining that the device data matches the at least one motion, where authenticating the first device indicates that the user is a human.

20 Claims, 6 Drawing Sheets

(56) References Cited

U.S. PATENT DOCUMENTS

| | | | |
|---|---|---|---|
| 2016/0300054 A1* | 10/2016 | Turgeman | G06F 21/36 |
| 2017/0001104 A1 | 1/2017 | Gross | |
| 2017/0104740 A1* | 4/2017 | Hoy | H04L 63/1441 |
| 2017/0316191 A1 | 11/2017 | Sipos et al. | |
| 2017/0364675 A1* | 12/2017 | Vilke | H04L 9/3226 |
| 2018/0098220 A1 | 4/2018 | Frank et al. | |

OTHER PUBLICATIONS

Dehghan, "Qatar Airways plane forced to land after wife discovers husband's affair midflight", Nov. 8, 2017, 3 pages.

Unknown, "wjcrowcroft/MotionCAPTCHA", printed Jan. 24, 2020, 3 pages.

Hupperich et al., "Sensor Captchas: On the Usability of Instrumenting Hardware Sensors to Prove Liveliness", International Conference on Trust and Trustworthy Computing, Conference paper. First Online: Aug. 21, 2016, 24 pages.

Cui et al., "A CAPTCHA Implementation Based on 3D Animation", 2009 International Conference on Multimedia Information Networking and Security, Nov. 18-20, 2009, pp. 179-182.

Lefebvre, R., "Control Your iPhone With Your Face—Set Up Switch Control In 7.1 [iOS Tips]", Mar. 13, 2014, 17 pages.

Muller, C., "Cybersecurity experts latest to trick Face ID w/ 3D-printed mask & infrared eye cutouts [Video]", Nov. 27, 2017, 7 pages.

Cui et al., "A 3-layer Dynamic CAPTCHA Implementation", 2010 Second International Workshop on Education Technology and Computer Science, Mar. 6-7, 2010, pp. 23-26.

Shumilov et al., "Gesture-based animated CAPTCHA", Publication date: Jul. 11, 2016, Abstract Only, 2 pages.

Mell et al., "The NIST Definition of Cloud Computing", Recommendations of the National Institute of Standards and Technology, Sep. 2011, 7 pages.

* cited by examiner

MOTION-BASED CHALLENGE-RESPONSE AUTHENTICATION MECHANISM

BACKGROUND

The present disclosure relates to challenge-response authentication, and, more specifically, to a motion-based challenge-response authentication mechanism.

Challenge-response tests are used to determine whether a user of a data processing system is a human or a web robot (otherwise referred to as a bot). Challenge-response tests include numerous protocols whereby one party presents a question (e.g., a challenge) and another party provides a valid answer (e.g., a response) in order to be authenticated. Authentication can result in a successful access (e.g., to a website, to a reservation system, to a database, etc.), a successful transaction (e.g., a completed purchase, a completed reservation, etc.), or another successful outcome enabling a human user access to desired content.

SUMMARY

Aspects of the present disclosure are directed toward a computer-implemented method comprising presenting a motion-based challenge-response instruction to a user via a user interface of a first device of a plurality of devices associated with the user and communicatively coupled to one another by a network, where the motion-based challenge-response instruction describes at least one motion that is performable by the user and detectable by at least one of the plurality of devices, and where the motion-based challenge-response instruction is configured to differentiate humans from bots. The method further comprises determining that device data from one or more of the plurality of devices matches the at least one motion. The method further comprises authenticating the first device in response to determining that the device data matches the at least one motion, where authenticating the first device indicates that the user is a human user.

Additional aspects of the present disclosure are directed to systems and computer program products configured to perform the method described above. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward challenge-response authentication, and, more specifically, to a motion-based challenge-response authentication mechanism. While not limited to such applications, embodiments of the present disclosure may be better understood in light of the aforementioned context.

One type of challenge-response test is the Completely Automated Public Turing test to tell Computers and Humans Apart (CAPTCHA). CAPTCHAs require a user to enter a correct sequence of symbols (e.g., letters, numbers, symbols, etc.) based on a distorted image of the sequence of symbols, where the distorted image is unsuitable for optical character recognition. CAPTCHAs require invariant recognition (e.g., the ability to recognize a known character despite many possible variations/distortions of the character), segmentation (e.g., the ability to separate characters from one another amongst crowded or overlapping characters), and/or context (e.g., the ability to identify a character which may be individually ambiguous but when considered together with the surrounding characters is obvious) to successfully pass. Invariant recognition, segmentation, and contextualization are basic human skills that are difficult to replicate in virtual machines such as bots. Nonetheless, with recent advancements and improvements in deep learning, machine learning, and the like, advances are anticipated that will provide bots with at least basic abilities in invariant recognition, segmentation, and/or contextualization that may jeopardize the ability of traditional CAPTCHA protocols to successfully differentiate humans from bots.

In light of the challenges discussed above, aspects of the present disclosure are directed to using physical movement to differentiate computers from humans in challenge-response authentication protocols. More specifically, aspects of the present disclosure are directed to using a CAPTCHA challenge that requires physical movement of a person or a device to satisfy the CAPTCHA challenge. The physical movement can involve a user moving the device according to instructions (e.g., rotating the device, shaking the device, orienting the device, etc.), the user capturing their personal movement using a camera of a device (e.g., using a camera of a smartphone to capture a user jumping, waving, smiling, winking, etc.), and/or the user physically interacting with the device (e.g., tapping a touch screen in a predetermined manner, drawing a symbol on the touch screen, etc.).

Using physical movement to satisfy a CAPTCHA challenge can improve the security and/or accuracy of the CAPTCHA because movement is more difficult to impersonate by a bot than other CAPTCHA challenges such as translating distorted text. For example, whereas advances in optical character recognition, machine learning, and/or artificial intelligence may be able to overcome the distorted characters traditionally used in CAPTCHA challenges, these and other technologies would nonetheless have difficulty overcoming a motion-based CAPTCHA challenge. To overcome a motion-based CAPTCHA challenge, a bot would be required to, for example, generate fake video or image data illustrating a user performing an action or, as another example, generate fake accelerometer data or gyroscope data suggesting that a device is being moved in a predetermined manner. Thus, motion-based CAPTCHAs or other motion-based challenge-response authentication protocols as discussed in the present disclosure can result in improved security and/or accuracy relative to traditional challenge-response authentication protocols for the purpose of differentiating humans and computers.

Accurate and secure challenge-response authentication protocols are useful for mitigating denial of service (DOS) or distributed denial of server (DDOS) attacks. For example, challenge-response authentication protocols can be used to prevent bots from accessing a website, portal, or application so that humans can successfully access the website, portal, or application. By filtering bots from automatically accessing the website, portal, or application (using an effective challenge-response authentication protocol) the risk of overloading the website, portal, or application with superfluous requests is reduced. In other words, challenge-response authentication protocols can mitigate the cybersecurity attack vector related to denial of service attacks using bots.

Figure 1:
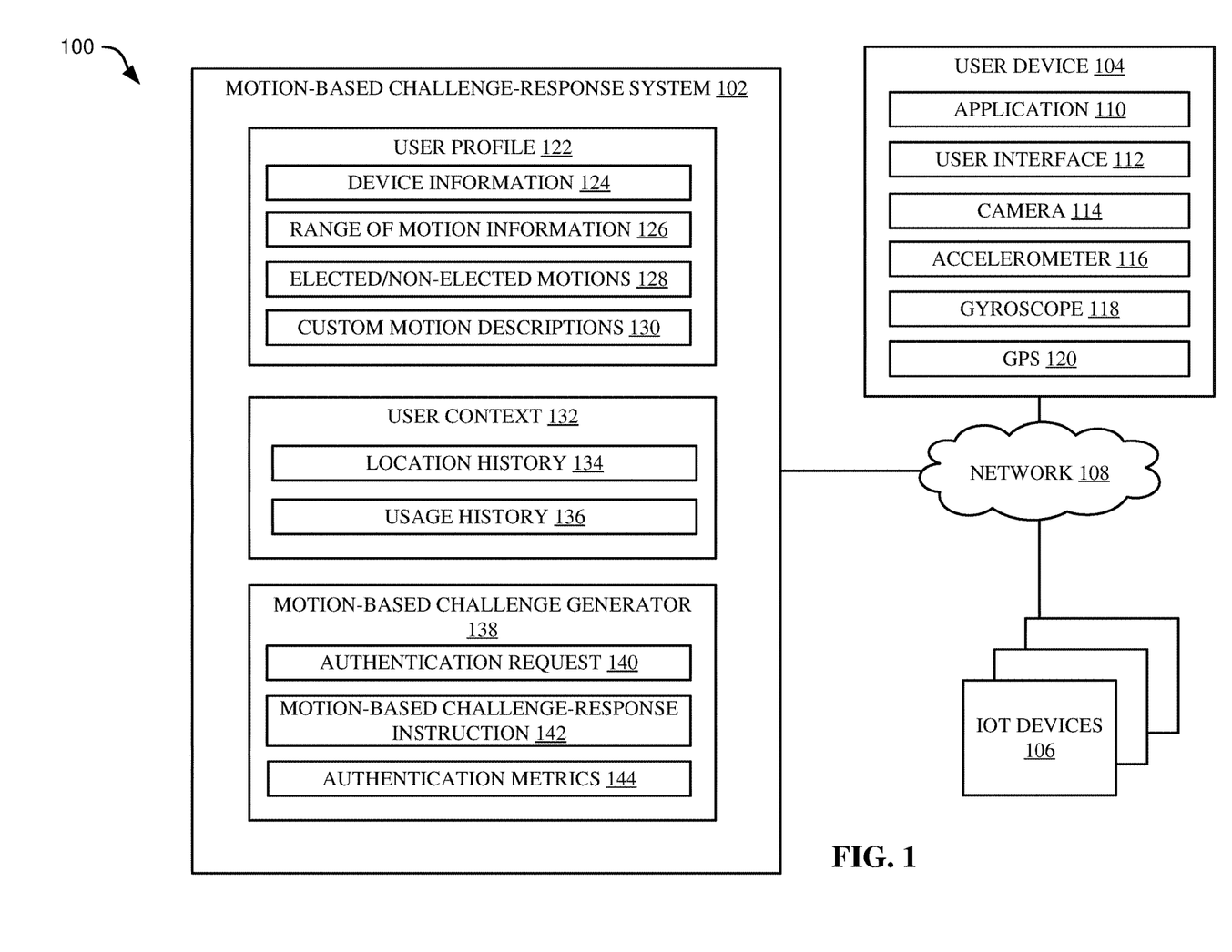
FIG. 1 illustrates a block diagram of an example authentication environment, in accordance with some embodiments of the present disclosure.

Referring now to the figures, FIG. 1 illustrates a block diagram of an example motion-based challenge-response authentication environment 100, in accordance with some embodiments of the present disclosure. The motion-based challenge-response authentication environment 100 can include a motion-based challenge-response system 102 that is continuously or intermittently communicatively coupled to a user device 104 and a plurality of Internet of Things (IoT) devices 106 by one or more wired or wireless networks 108.

In some embodiments, the network 108 can include, for example, a wide area network (WAN), a local area network (LAN), a cellular network, a short-range network, the Internet, or the like. In some embodiments, network 108 is a short-range network, such as, but not limited to, networks utilizing Institute of Electrical and Electronics Engineers (IEEE) 802.15 standards, IEEE 1902.1 standards, personal area networks (PAN), Bluetooth™ networks, Near Field Communication (NFC) networks, Infrared Data Association (IrDA) networks, Internet Protocol version 6 (IPv6) over Low-Power Wireless Personal Area Networks (6LoWPAN), DASH7 Alliance Protocol (D7A) networks, RuBee networks, Ultra-wideband (UWB) networks, Frequency Modulation (FM)-UWB networks, Wireless Ad Hoc Networks (WANET), Z-Wave networks, ZigBee™ networks, and other short-range networks, communication protocols, and the like.

User device 104 can be, but is not limited to, a smartphone, a tablet, a laptop, a computer, a desktop, or another electronic device that may use authentication mechanisms such as motion-based challenge-response authentication mechanisms. IoT devices 106 can be other electronic devices associated with a same user of the user device 104. IoT devices 106 can include, but are not limited to, smartphones, tablets, laptops, computers, desktops, smartwatches, smartglasses, wearable devices, health trackers, appliances, vehicles, and the like.

User device 104 can include one or more applications 110, a user interface 112, a camera 114, an accelerometer 116, a gyroscope 118, and/or a global positioning system (GPS) 120. The one or more applications 110 can include applications such as, but not limited to, web browsers, mapping applications, financial applications, health and wellness applications, social media applications, and/or other applications that may benefit from a motion-based challenge-response authentication mechanisms. Although the term "application" is used above, application 110 can likewise refer to portals, websites, or other network-accessible functionalities.

The user interface 112 can include an electronic screen capable of presenting information to a user of the user device 104. In some embodiments, the user interface 112 includes a touch screen capable of receiving tactile input from the user of the user device 104.

The camera 114 includes functionality for capturing images and/or videos. The camera 114 can, for example, capture images and/or videos of the user performing one or more motions as required by a motion-based challenge-response authentication mechanism when the user is visible to the camera 114.

The accelerometer 116 includes functionality for measuring acceleration and can be used to properly orient content displayed on the user interface 112 of the user device 104 and/or to detect motion that is part of a response to a motion-based challenge-response instruction 142. Accelerometer 116 can comprise, for example, a piezoelectric accelerometer, a piezoresistive accelerometer, a capacitive accelerometer, a micro electro-mechanical system (MEMS) accelerometer, a convective accelerometer, a thermal accelerometer, or another type of accelerometer.

The gyroscope 118 includes functionality for measuring orientation and/or angular velocity. Thus, the gyroscope 118 can collect information related to position and orientation of the user device 104 that may be used to satisfy a motion-based challenge-response authentication mechanism. The gyroscope 118 can be, for example, a mechanical gyroscope, a gas-bearing gyroscope, an optical gyroscope, or another type of gyroscope.

The global positioning system (GPS) functionality (GPS 120) can include hardware and/or software useful for satellite-based radionavigation. However, GPS 120 can refer to any one of the global navigation satellite systems (GNSS) now known or later developed. GPS 120 can collect and store location information of the user device 104.

In some embodiments, the accelerometer 116, the gyroscope 118, and/or the GPS 120 can be individually or collectively referred to as motion-based sensors that generate motion-sensor data. In some embodiments, any of the camera 114, accelerometer 116, gyroscope 118, and/or GPS 120 can be referred to as sensors that generate sensor data.

Although not shown, the IoT devices 106 can include a variety of components similar to the components discussed above with respect to the user device 104. However, the individual configurations of the various IoT devices 106 can vary, thus, some IoT devices 106 may include more, fewer, and/or different components than the components illustrated in user device 104 (e.g., various IoT devices 106 may include a heart-rate monitor, a microphone, etc.).

Motion-based challenge-response system 102 can comprise a standalone system remote from the user device 104 and/or the IoT devices 106 but communicatively coupled to the user device 104 and/or the IoT devices 106 via the network 108. In other embodiments, the motion-based challenge-response system 102 comprises software loaded onto the user device 104 and executable by the user device 104. In some embodiments, the motion-based challenge-response system 102 is incorporated into an application 110, whereas in other embodiments, the motion-based challenge-response system 102 is a distinct application that is interoperable with numerous applications 110 on the user device 104 for the purpose of providing motion-based challenge-response authentication functionality to all of the numerous applications 110.

The motion-based challenge-response system 102 can include a user profile 122, a user context 132, and a motion-based challenge generator 138. The motion-based challenge-response system 102 can be configured to generate a motion-based challenge that differentiates humans from bots by requiring the user to physically manipulate (e.g., rotate, move, etc.) the user device 104 and/or one of the IoT devices 106, perform a motion (e.g., a gesture, a facial expression, a body movement, etc.), interact with the user device 104 or one of the plurality of IoT devices 106 (e.g., draw a predefined pattern, tap the screen in a predefined manner, etc.), and/or other motions defined by a motion-based challenge-response instruction 142 that may be useful for differentiating humans from bots.

The user profile 122 includes device information 124, range of motion information 126, elected/non-elected motions 128, and/or custom motion descriptions 130. The device information 124 can include information related to devices associated with a single user and that can be used as part of the motion-based challenge-response authentication protocol. For example, the device information 124 can include information of user device 104 and IoT devices 106.

Range of motion information 126 can include measures of ranges of motion for a user of the user device 104 and IoT devices 106. The range of motion information 126 can relate to, for example, head movements, arm movements, leg movements, hand movements, finger movements, and the like. Range of motion information 126 can be useful for adapting the motion-based challenge-response system 102 to users with limited ranges of motion as a result of a disability, an injury, a condition, or a preference. Defining ranges of motion information 126 can improve the accuracy of the motion-based challenge-response system 102 by calibrating the various movements a user may be instructed to perform to the user's ability to perform those movements. For example, instructing various users to "nod" can result in different motions in terms of range (e.g., magnitude), direction (e.g., orientation), and/or duration (e.g., speed, frequency, etc.). Accordingly, range of motion information 126 can be used to characterize a "nod" for an individual use.

Elected/non-elected motions 128 can be based on user input and can include selections that a user of user device 104 and IoT devices 106 has explicitly elected (e.g., selected, added) and/or explicitly un-elected (e.g., deselected, removed) to be used with the motion-based challenge-response system 102. For example, a user may un-elect facial expressions if the user feels that making facial expressions as part of a motion-based challenge-response authentication protocol may appear confusing to others or embarrassing to oneself.

Custom motion descriptions 130 can include a user-defined mapping of customized names to predetermined motions. Custom motion descriptions 130 can provide an additional layer of security for the motion-based challenge-response system 102. For example, a user may invert "left" and "right" in the custom motion descriptions 130 so that if a motion-based challenge-response instruction 142 recites "wave your right hand" the user understands that in order to successfully authenticate the user must wave his or her left hand insofar as "right" means "left" according to the custom motion descriptions 130.

User context 132 includes location history information 134 and usage history information 136. Location history information 134 refers to both present and historical locations of the user device 104 and/or the IoT devices 106. Location history information 134 can be retrieved from, for example, the GPS 120. In some embodiments, the location history information 134 is used to determine an environment of the user and determine an appropriate motion-based challenge-response instruction 142 based on the user's environment. For example, if the location history information 134 indicates that the user has been traveling at a high speed and at a high altitude, the motion-based challenge-response system 102 can deduce that the user is in an airplane and is thus unlikely to perform a motion such as "jump" while on the airplane. Thus, location history information 134 can be used to infer information about a user's environment that may be useful in selecting an appropriate motion-based challenge-response instruction 142.

The usage history information 136 can refer to if and how various devices such as user device 104 and IoT devices 106 are being used in a vicinity of time around receiving an authentication request 140 but before generating the motion-based challenge-response instruction 142. For example, if an IoT device 106 such as a tablet is near the user according to the location history information 134, but the tablet has not been used for several hours, the motion-based challenge-response system 102 may elect to not use the tablet as part of motion-based challenge-response instruction 142 but instead use another IoT device 106, such as a smartwatch, which was used by the user within the previous ten minutes of receiving the authentication request 140.

The motion-based challenge generator 138 can be a functional sub-system of the motion-based challenge-response system 102. The motion-based challenge generator 138 can be configured to receive an authentication request 140 from, for example, an application 110 executing on the user device 104, or from a third-party website via the network 108, where the authentication request 140 can relate to an access attempt to the application 110 or the third-party website by the user device 104.

After receiving the authentication request 140, the motion-based challenge generator 138 can generate a motion-based challenge-response instruction 142 to present on the user interface 112 of the user device 104. The motion-based challenge generator 138 can also generate authentication metrics 144 for comparing data received from the user device 104 and/or the IoT devices 106 to determine if the received data complies with the motion-based challenge-response instruction 142. If the received data does comply with the motion-based challenge-response instruction, the authentication request 140 can thereby be authenticated. Motion-based challenge-response instruction 142 can include, for example, text, images, graphics, audio data, video data, and/or games (e.g., a gamified motion-based challenge) that describe a motion that is performable by the user and detectable by the user device 104 and/or the IoT devices 106. Motion-based challenge-response instruction 142 can be single step or multi-step. A single step motion-based challenge-response instruction 142 can be, for example, "rotate your phone 360°" or "rotate your phone so that the two lines overlap each other" (where the motion-based challenge-response instruction 142 is gamified so that two lines are present on the user interface 112 and are movable by rotating the phone). A multi-step motion-based challenge-response instruction 142 can be, for example, "check the time on your smartwatch, and then shake your phone twice" or "smile and then wink your right eye."

Authentication metrics 144 can be ranges of acceptable values against which to compare received data from the user device 104 and/or the IoT devices 106 in order to confirm or disconfirm compliance with the motion-based challenge-response instruction 142. For example, authentication metrics 144 can include acceptable ranges of data from the accelerometer 116 and/or the gyroscope 118 for determining compliance with motion instructions of the user device 104 in the motion-based challenge-response instructions 142 (e.g., rotate, tilt, shake, swing, etc.). Likewise, authentication metrics 144 can include metrics related to computer vision for motion-based challenge-response instructions 142 having a visual component (e.g., facial expressions, video capturing head movements, arm movements, hand movements, finger movements, leg movements, etc.).

Figure 2:
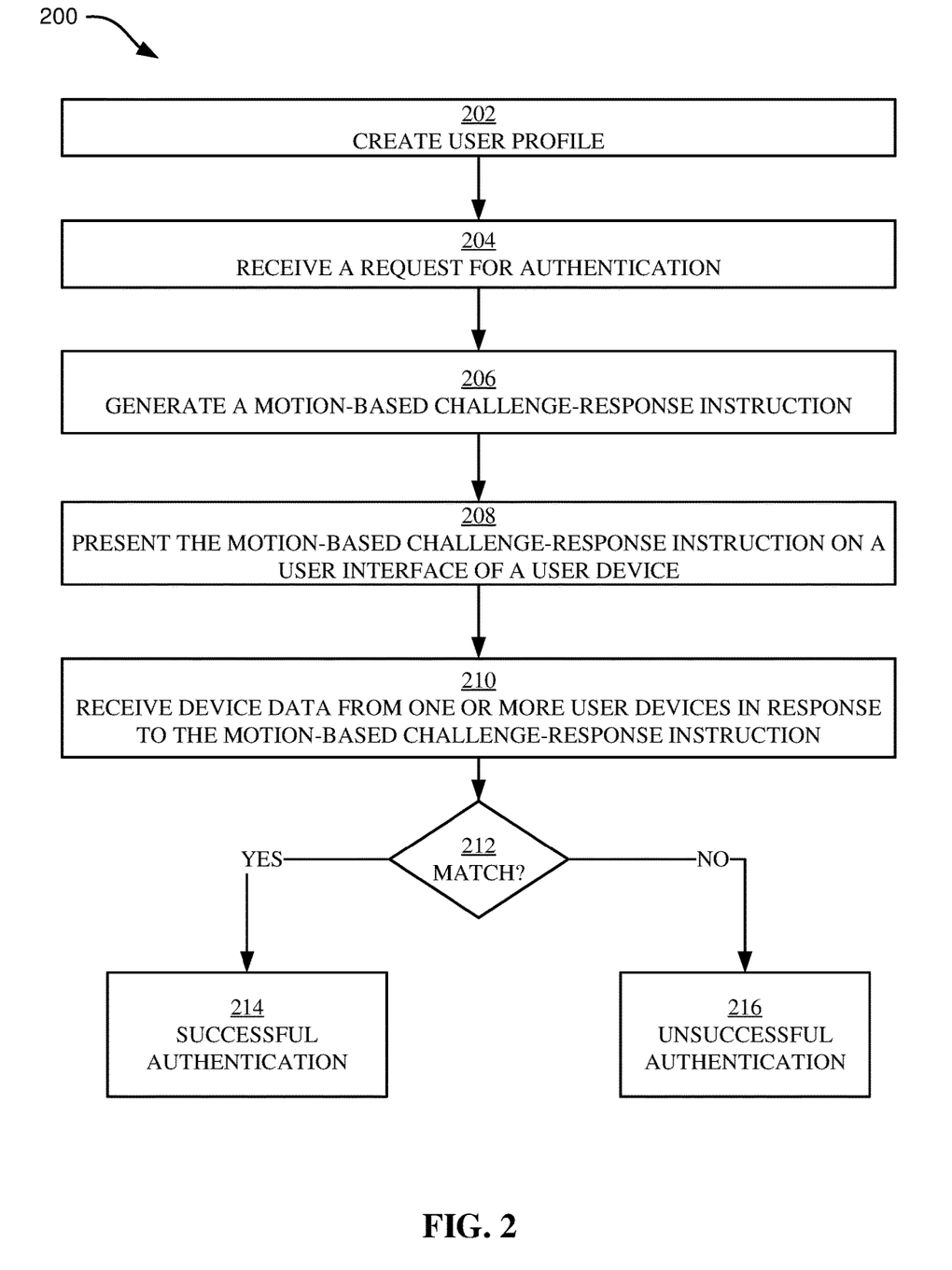
FIG. 2 illustrates a flowchart of an example method for motion-based challenge-response authentication, in accordance with some embodiments of the present disclosure.

Referring now to FIG. 2, illustrated is a flowchart of an example method 200 for using a motion-based challenge-response system 102, in accordance with some embodiments of the present disclosure. The method 200 can be implemented by, for example, the motion-based challenge-response system 102, a computer, a processor, or another configuration of hardware and/or software.

Operation 202 includes creating a user profile 122. Creating the user profile 122 can include establishing device information 124, range of motion information 126, elected/non-elected motions 128, and/or custom motion descriptions 130 based on user input to the motion-based challenge-response system 102. Operation 202 is discussed in more detail hereinafter with respect to FIG. 3.

Operation 204 includes receiving an authentication request 140. The authentication request 140 can be received from, for example, an application 110 executing on the user device 104 or from a third-party server (e.g., a third-party website) that is interacting with the user device 104 via the network 108. The authentication request 140 can include an identifier of the user device 104 and a request to confirm that the user of the user device 104 is a human user rather than a bot.

Operation 206 includes generating a motion-based challenge-response instruction 142 in response to receiving the authentication request 140, and where the motion-based challenge-response instruction 142 is based on the user profile 122 and the user context 132. The motion-based challenge-response instruction 142 can provide instructions for performing a motion that is performable by the user and detectable by the user device 104 and/or the IoT devices 106. For example, the motion-based challenge-response instruction 142 can be generated in order to satisfy the various preferences and/or parameters defined in user profile 122 while also being appropriate in light of the user context 132. As previously discussed, and as one non-limiting example, for a user context 132 that indicates the user is in an airplane, the motion-based challenge-response instruction 142 will not include an instruction to jump, even though an instruction to jump may be included in another motion-based challenge-response instruction 142 that is associated with a user context 132 indicating the user is at home (e.g., where jumping may be appropriate). Thus, operation 206 can include one or more of: (i) randomly selecting a motion (that is an elected motion or not an un-elected motion according to elected/non-elected motions 128) and that is an appropriate motion in light of the user context 132; (ii) generating authentication metrics 144 based on the range of motion information 126 for the randomly selected motion; and/or (iii) converting the randomly selected motion to the motion-based challenge-response instruction 142 according to the custom motion descriptions 130.

Operation 208 includes presenting the motion-based challenge-response instruction 142 to the user interface 112 of the user device 104. The motion-based challenge-response instruction 142 can comprise one or more of: text, image(s), graphic(s), audio, video, games (e.g., a gamified motion-based challenge), and so on.

Operation 210 includes receiving device data from one or more user devices (e.g., user device 104 and/or IoT devices 106) in response to presenting the motion-based challenge-response instruction 142 on the user interface 112 of the user device 104. The device data can include, for example, video or image data received from camera 114, motion and/or orientation data received from accelerometer 116, orientation data received from gyroscope 118, location data received from GPS 120, and/or other device data useful for directly measuring motion or indirectly inferring motion.

Operation 212 includes determining whether or not the device data received in operation 210 satisfies (e.g., matches) authentication metrics 144 associated with the motion-based challenge-response instructions 142. If so (212: YES), the method 200 can proceed to operation 214 and indicate a successful authentication. If not (212: NO), the method 200 can proceed to operation 216 and indicate an unsuccessful authentication.

Operation 214 can include transmitting a successful authentication indication to the sender of the authentication request 140 (e.g., the application 110 of user device 104, the third-party website, etc.). In some embodiments, operation 214 includes permitting access to the application 110 or the third-party website in response to transmitting the successful authentication indication.

Operation 216 can include generating a new motion-based challenge-response instruction 142 and displaying the new motion-based challenge-response instruction 142 on the user interface 112. Generating a new motion-based challenge-response instruction 142 can be useful for providing a user with another chance to successfully pass the authentication request 140 where the initial motion-based challenge-response instruction 142 may have been unclear, or where the user may have been unable to perform the initial motion-based challenge-response instruction 142 for any number of reasons.

Figure 3:
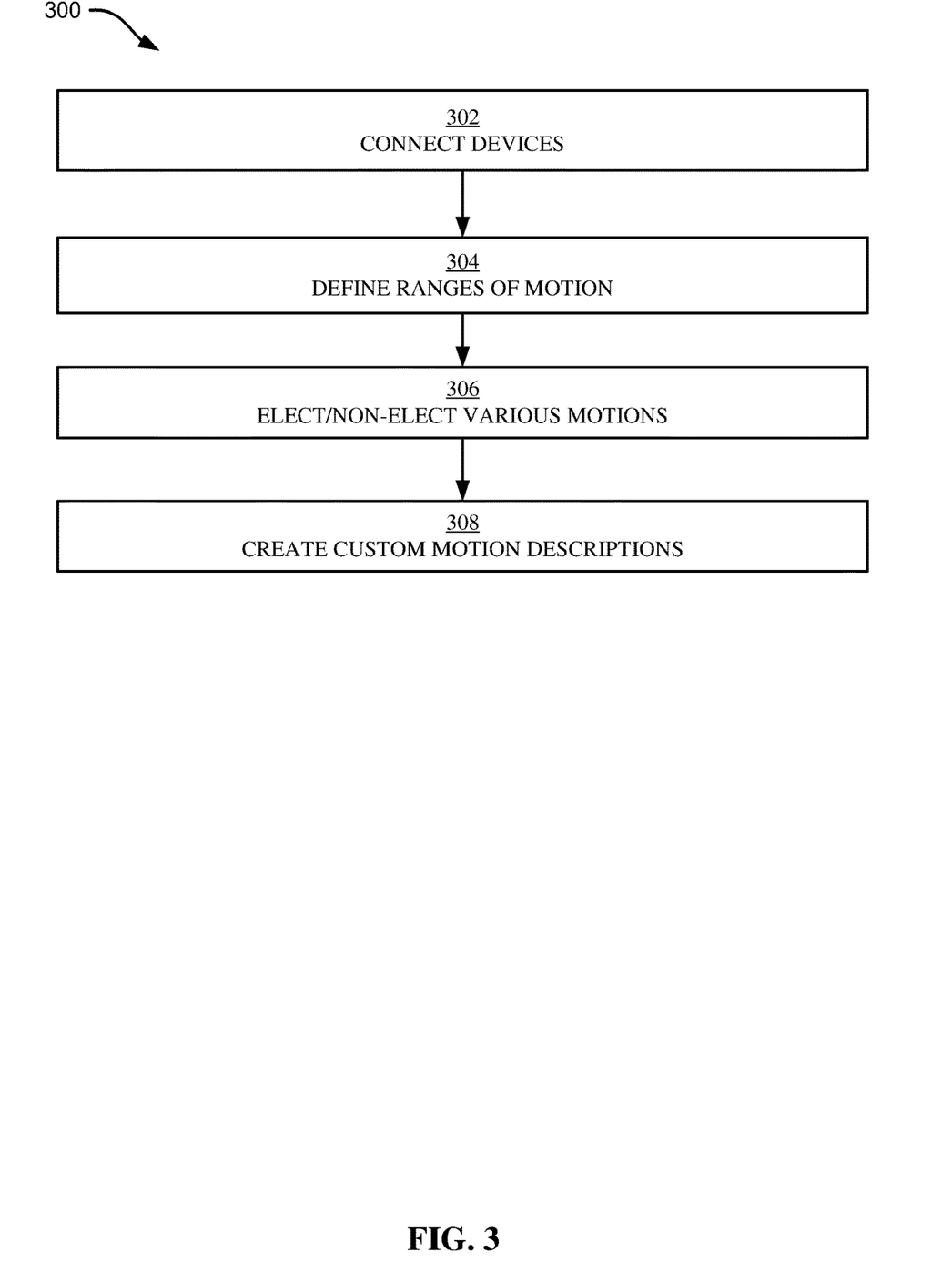
FIG. 3 illustrates a flowchart of an example method for creating a user profile associated with a motion-based challenge-response authentication system, in accordance with some embodiments of the present disclosure.

Referring now to FIG. 3, illustrated is a flowchart of an example method 300 for defining a user profile 122, in accordance with some embodiments of the present disclosure. In some embodiments, the method 300 is a sub-method of operation 202 of FIG. 2. In some embodiments, the method 300 is performed based on user input to a motion-based challenge-response system 102, a computer, a processor, or another configuration of hardware and/or software.

Operation 302 includes creating device information 124 by associating the user device 104 and/or IoT devices 106 with the user profile 122. In some embodiments, operation 302 includes communicatively coupling the user device 104 and/or the IoT devices 106 to the motion-based challenge-response system 102 by a network 108, such as, for example, a short-range network. Connecting the user device 104 and/or the IoT devices 106 to the motion-based challenge-response system 102 by the short-range network can enable the motion-based challenge-response system 102 to automatically gather information such as, but not limited to, device identification information, device configuration information, device sensor information, and the like.

Operation 304 includes defining range of motion information 126 for the user associated with the user profile 122. In some embodiments, operation 304 directly defines range of motion information 126 by presenting various test motions to the user interface 112 of user device 104 and measuring the user's ability to perform the test motions based on image or video data received from the camera 114. For example, test motions can be "nod your head," "turn your head to the right," "wave with your right hand," and so on while the camera 114 collects video data of the user performing the test motions and the range of motion information 126 stores magnitudes, orientations, and/or speeds derived from the video data as characterization data (such as authentication metrics 144) for each test motion. In other embodiments, operation 304 indirectly defines range of motion information 126 by presenting various test motions to the user interface 112 of the user device 104 and measuring the user's ability to perform the test motions based on data from the accelerometer 116, gyroscope 118, and/or GPS 120. For example, test motions can be "rotate your phone 360°," "shake your phone three times," "hold your phone upside down for five seconds," and the like while the range of motion information 126 stores data from the accelerometer 116, gyroscope 118, and/or GPS 120 as characterization data (such as authentication metrics 144) for each test motion. Thus, range of motion information 126 can be used to calibrate authentication metrics 144 for respective motions that may be instructed according to the motion-based challenge-response instruction 142.

Operation 306 includes defining elected/non-elected motions 128. In some embodiments, operation 306 comprises presenting a variety of motions to the user interface 112 and enabling the user to select or deselect various motions of the variety of motions. The selected motions can be defined as elected motions, whereas the deselected motions can be defined as non-elected motions. Accordingly, the motion-based challenge generator 138 can be configured to only use elected motions as defined in elected/non-elected motions 128 (or to use any motion that is not a non-elected motion).

Operation 308 includes defining custom motion descriptions 130. The custom motion descriptions 130 can map elected motions from the elected/non-elected motions 128 to customized descriptions. The customized descriptions can be defined using text and/or images input by a user. Using custom motion descriptions 130 can add additional security to the motion-based challenge generator 138 insofar as the custom motion descriptions 130 can be difficult to decipher by an unauthorized user such as a bot.

Figure 4:
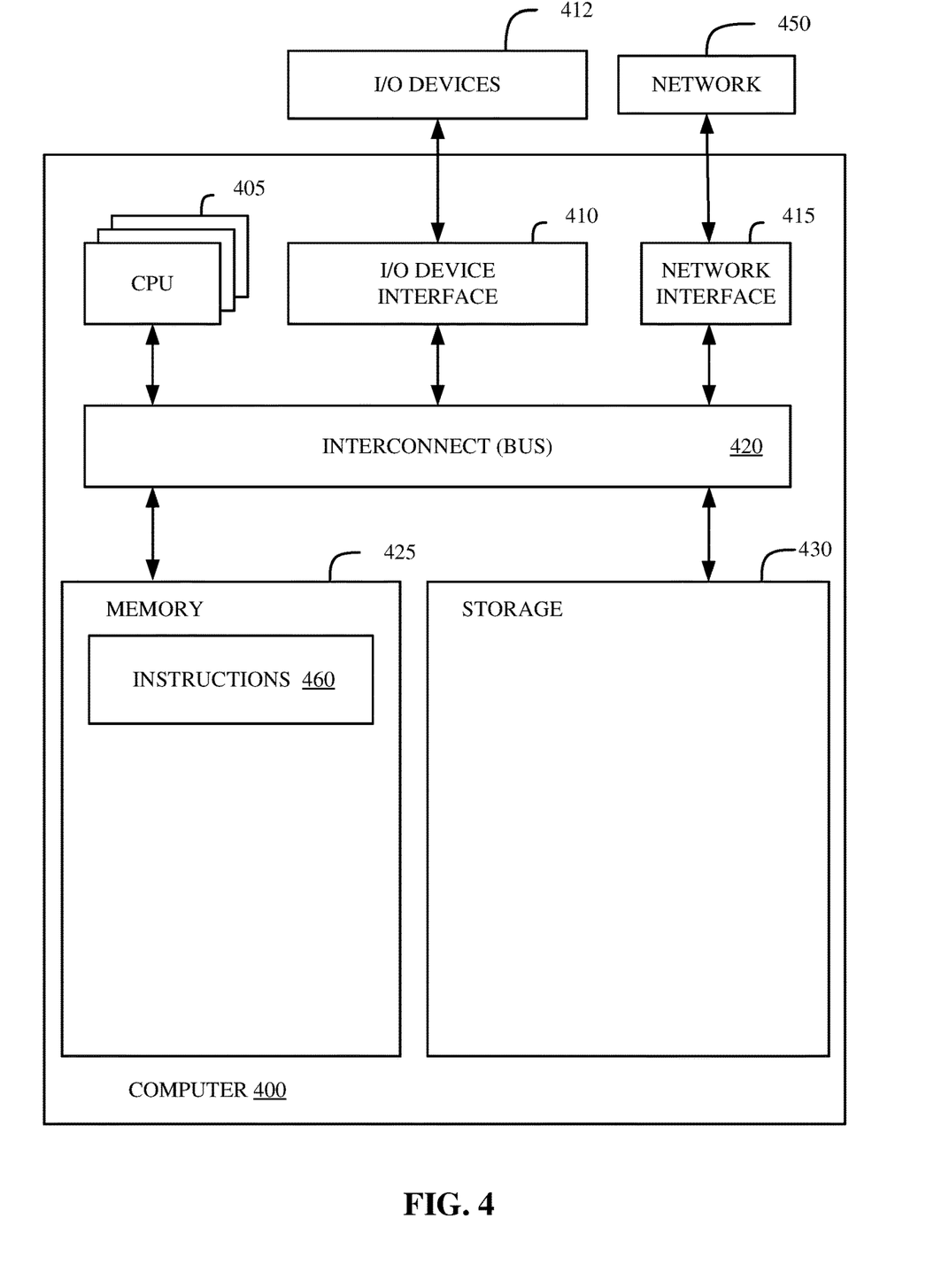
FIG. 4 illustrates a block diagram of an example computer, in accordance with some embodiments of the present disclosure.

FIG. 4 illustrates a block diagram of an example computer 400 in accordance with some embodiments of the present disclosure. In various embodiments, computer 400 can perform the methods described in any one or more of FIGS. 2-3 and/or implement the functionality discussed in any one of FIG. 1. In some embodiments, computer 400 receives instructions related to the aforementioned methods and functionalities by downloading processor-executable instructions from a remote data processing system via network 450. In other embodiments, computer 400 provides instructions for the aforementioned methods and/or functionalities to a client machine such that the client machine executes the method, or a portion of the method, based on the instructions provided by computer 400. In some embodiments, the computer 400 is incorporated into (or functionality similar to computer 400 is virtually provisioned to) the motion-based challenge-response system 102, the user device 104, the IoT devices 106, or another aspect of the present disclosure.

Computer 400 includes memory 425, storage 430, interconnect 420 (e.g., BUS), one or more CPUs 405 (also referred to as processors herein), I/O device interface 410, I/O devices 412, and network interface 415.

Each CPU 405 retrieves and executes programming instructions stored in memory 425 or storage 430. Interconnect 420 is used to move data, such as programming instructions, between the CPUs 405, I/O device interface 410, storage 430, network interface 415, and memory 425. Interconnect 420 can be implemented using one or more busses. CPUs 405 can be a single CPU, multiple CPUs, or a single CPU having multiple processing cores in various embodiments. In some embodiments, CPU 405 can be a digital signal processor (DSP). In some embodiments, CPU 405 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 425 is generally included to be representative of a random-access memory (e.g., static random-access memory (SRAM), dynamic random access memory (DRAM), or Flash). Storage 430 is generally included to be representative of a non-volatile memory, such as a hard disk drive, solid state device (SSD), removable memory cards, optical storage, or flash memory devices. In an alternative embodiment, storage 430 can be replaced by storage area-network (SAN) devices, the cloud, or other devices connected to computer 400 via I/O device interface 410 or network 450 via network interface 415.

In some embodiments, memory 425 stores instructions 460. However, in various embodiments, instructions 460 are stored partially in memory 425 and partially in storage 430, or they are stored entirely in memory 425 or entirely in storage 430, or they are accessed over network 450 via network interface 415.

Instructions 460 can be computer-readable and computer-executable instructions for performing any portion of, or all of, any of the methods of FIGS. 2-3 and/or implement the functionality discussed in FIG. 1. In some embodiments, instructions 460 can be referred to as motion-based challenge-response software, motion-based challenge-response functionality, a motion-based challenge-response protocol, or a motion-based challenge-response authentication mechanism. Although instructions 460 are shown in memory 425, instructions 460 can include program instructions collectively stored across numerous computer-readable storage media and executable by one or more CPUs 405.

In various embodiments, I/O devices 412 include an interface capable of presenting information and receiving input. For example, I/O devices 412 can present information to a user interacting with computer 400 and receive input from the user.

Computer 400 is connected to network 450 via network interface 415. Network 450 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
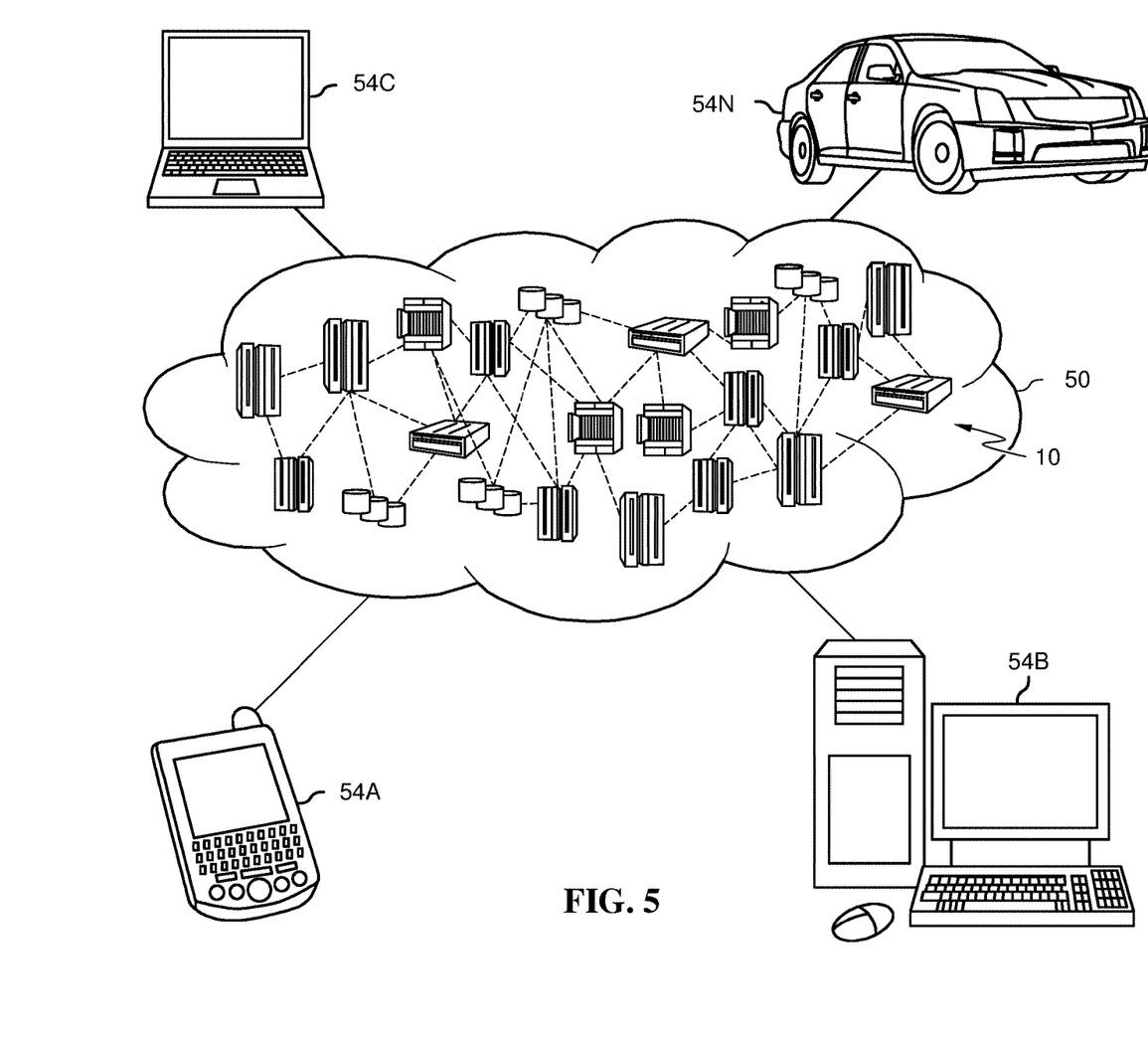
FIG. 5 depicts a cloud computing environment, in accordance with some embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
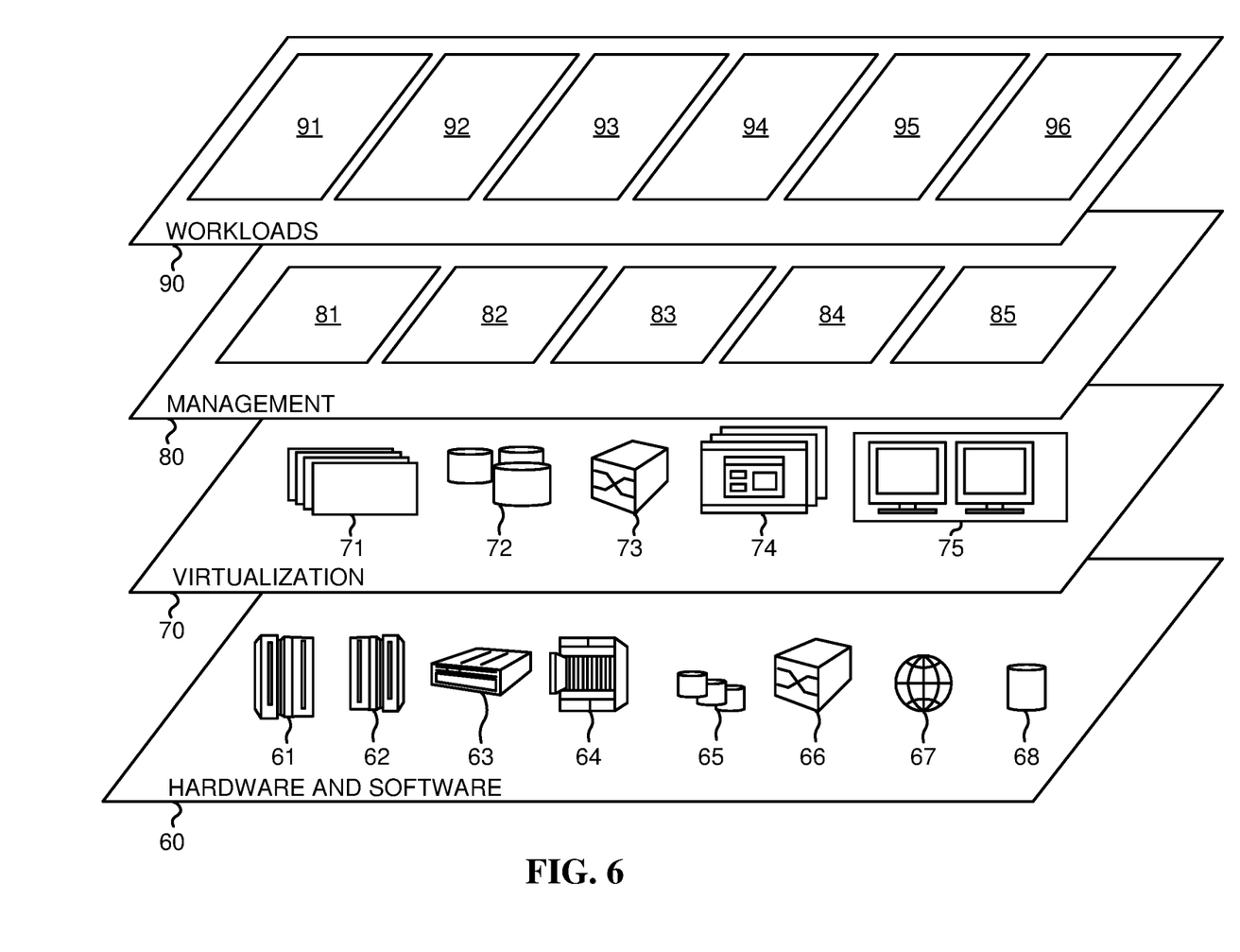
FIG. 6 depicts abstraction model layers, in accordance with some embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and motion-based challenge-response authentication 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 460 of FIG. 4 and/or any software configured to perform any subset of the methods described with respect to FIGS. 2-3 and/or implement the functionality discussed in FIG. 1) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

What is claimed is:

1. A computer-implemented method comprising:
presenting a motion-based challenge-response instruction to a user via a user interface of a first device of a plurality of devices associated with the user and communicatively coupled to one another by a network, wherein the motion-based challenge-response instruction describes at least one motion that is performable by the user and detectable by a second device of the plurality of devices, wherein the motion-based challenge-response instruction is based on a current Global Positioning System (GPS) location of the first device and an availability of the second device inferred from a usage history of the second device, wherein the motion-based challenge-response instruction includes a customized text uniquely identifying a respective motion according to custom motion descriptions created by the user, and wherein the motion-based challenge-response instruction is configured to differentiate humans from bots;

determining that device data from the second device matches the at least one motion; and authenticating the first device in response to determining that the device data matches the at least one motion, wherein authenticating the first device indicates that the user is a human user.

2. The method of claim 1, wherein the method further comprises:

creating a user profile associated with the user and including the custom motion descriptions, wherein the custom motion descriptions include a plurality of customized texts respectively mapped to a plurality of motions.

3. The method of claim 1, wherein the motion-based challenge-response instruction includes instructions for rotating the second device, and wherein the device data comprises motion-sensor data from the second device.

4. The method of claim 1, wherein the motion-based challenge-response instruction includes instructions for moving the second device of the plurality of devices, and wherein the device data comprises motion-sensor data from the second device.

5. The method of claim 1, wherein the motion-based challenge-response instruction includes instructions for providing tactile input to a touch screen of the second device.

6. The method of claim 1, wherein the motion-based challenge-response instruction comprises a Completely Automated Public Turing test to tell Computers and Humans Apart (CAPTCHA), and wherein the at least one motion comprises a challenge generated by the CAPTCHA.

7. The method of claim 1, wherein the motion-based challenge-response instruction comprises an image of the at least one motion.

8. The method of claim 1, wherein the availability of the second device inferred from the usage history of the second device is based on an activation of the second device within a threshold time before presenting the motion-based challenge-response instruction.

9. The method of claim 1, wherein the motion-based challenge-response instruction is customized according to ranges of motion associated with the user and elected motions and non-elected motions associated with the user.

10. The method of claim 9, wherein the method further comprises:

creating a user profile associated with the user, wherein the user profile includes ranges of motion associated with the user including respective ranges of motion related to head movements, hand movements, arm movements, and finger movements.

11. The method of claim 10, wherein determining that the device data from the second device matches the at least one motion further comprises:

determining that the device data satisfies authentication metrics, wherein the authentication metrics are based on the ranges of motion associated with the user.

12. The method of claim 1, wherein the motion-based challenge-response instruction includes instructions for orienting the second device so that the user is visible to a camera of the second device, and wherein the camera is configured to collect device data of the user while the user is performing the at least one motion.

13. The method of claim 12, wherein the at least one motion includes a facial expression.

14. The method of claim 12, wherein the at least one motion includes a gesture.

15. The method of claim 1, wherein the method is performed by a host system according to software that is downloaded to the host system from a remote data processing system.

16. The method of claim 15, wherein the method further comprises:

metering a usage of the software; and generating an invoice based on metering the usage.

17. A system comprising:

one or more processors; and one or more computer-readable storage media storing program instructions which, when executed by the one or more processors, are configured to cause the one or more processors to perform a method comprising:

presenting a motion-based challenge-response instruction to a user via a user interface of a first device of a plurality of devices associated with the user and communicatively coupled to one another by a network, wherein the motion-based challenge-response instruction describes at least one motion that is performable by the user and detectable by a second device of the plurality of devices, wherein the motion-based challenge-response instruction is based on a current Global Positioning System (GPS) location of the first device and an availability of the second device inferred from a usage history of the second device, wherein the motion-based challenge-response instruction includes a customized text uniquely identifying a respective motion according to custom motion descriptions created by the user, and wherein the motion-based challenge-response instruction is configured to differentiate humans from bots;

determining that device data from the second device matches the at least one motion; and authenticating the first device in response to determining that the device data matches the at least one motion, wherein authenticating the first device indicates that the user is a human user.

18. The system of claim 17, wherein the motion-based challenge-response instruction is customized according to ranges of motion associated with the user and elected motions and non-elected motions associated with the user;

wherein the method further comprises:

creating a user profile associated with the user, wherein the user profile includes ranges of motion associated with the user including respective ranges of motion related to head movements, hand movements, arm movements, and finger movements; and wherein determining that the device data from the second device matches the at least one motion further comprises:

determining that the device data satisfies authentication metrics, wherein the authentication metrics are based on the ranges of motion associated with the user.

19. A computer program product comprising one or more computer readable storage media, and program instructions collectively stored on the one or more computer readable storage media, the program instructions comprising instructions configured to cause one or more processors to perform a method comprising:

presenting a motion-based challenge-response instruction to a user via a user interface of a first device of a plurality of devices associated with the user and communicatively coupled to one another by a network, wherein the motion-based challenge-response instruction describes at least one motion that is performable by the user and detectable by a second device of the plurality of devices, wherein the motion-based challenge-response instruction is based on a current Global Positioning System (GPS) location of the first device and an availability of the second device inferred from a usage history of the second device, wherein the motion-based challenge-response instruction includes a customized text uniquely identifying a respective motion according to custom motion descriptions created by the user, and wherein the motion-based challenge-response instruction is configured to differentiate humans from bots;

determining that device data from the second device matches the at least one motion; and authenticating the first device in response to determining that the device data matches the at least one motion, wherein authenticating the first device indicates that the user is a human user.

20. The computer program product of claim 19, wherein the motion-based challenge-response instruction is customized according to ranges of motion associated with the user and elected motions and non-elected motions associated with the user;

wherein the method further comprises:

creating a user profile associated with the user, wherein the user profile includes ranges of motion associated with the user including respective ranges of motion related to head movements, hand movements, arm movements, and finger movements; and wherein determining that the device data from the second device matches the at least one motion further comprises:

determining that the device data satisfies authentication metrics, wherein the authentication metrics are based on the ranges of motion associated with the user.

* * * * *